Aug. 18, 1925.
C. L. GEHNRICH
1,550,248
APPARATUS FOR CONVEYING ARTICLES
Filed Feb. 9, 1925
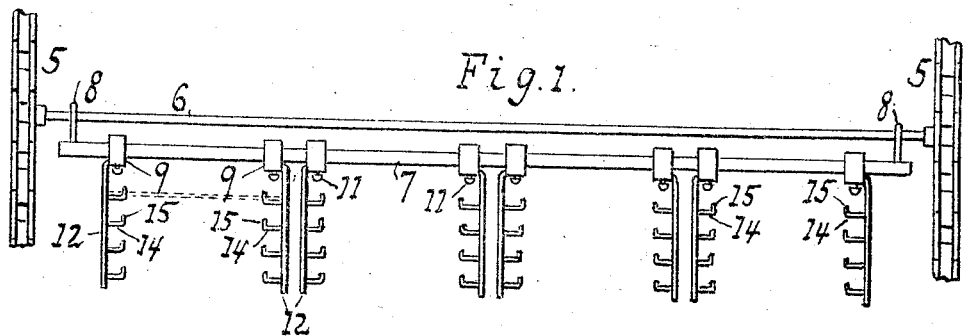
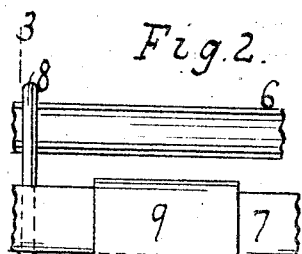
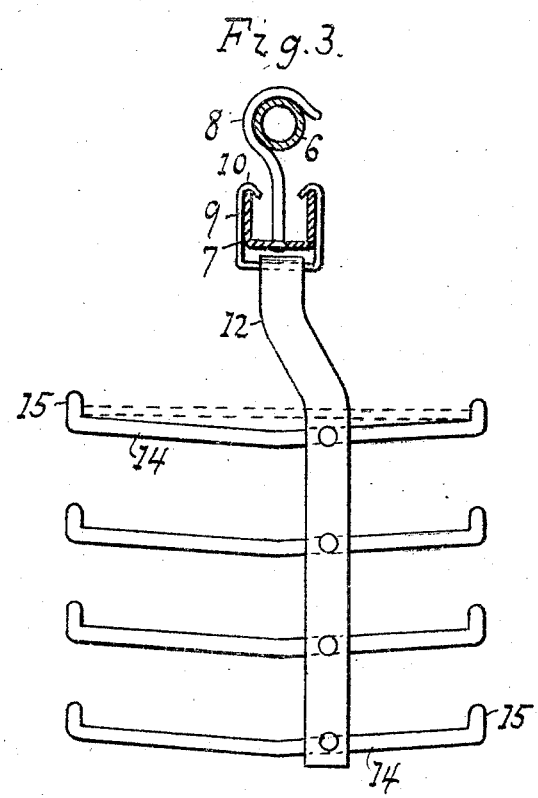
INVENTOR
Charles L. Gehnrich
BY
Hauff Sbarland
ATTORNEYS Patented Aug. 18, 1925.

1,550,248

UNITED STATES PATENT OFFICE.

CHARLES L. GEHNRICH, OF ELMHURST, NEW YORK, ASSIGNOR TO GEHNRICH INDIRECT HEAT OVEN COMPANY, OF LONG ISLAND CITY, NEW YORK, A CORPORATION OF NEW YORK.

APPARATUS FOR CONVEYING ARTICLES.

Application filed February 9, 1925. Serial No. 8,032.

*To all whom it may concern:*

Be it known that I, CHARLES L. GEHNRICH, a citizen of the United States, residing at Elmhurst, in the county of Queens and State of New York, have invented new and useful Improvements in Apparatus for Conveying Articles, of which the following is a specification.

This invention relates to an apparatus for conveying articles which have been coated with enamel, through a heated furnace in order to bake the coating on the substance.

The invention is designed to provide a series of racks for supporting the articles, and means for adjusting the racks to make them fit articles of different dimensions.

An object of the invention is to provide a simple and efficient method of removably mounting the racks on endless chains or belts, adapted to slowly travel in a labyrinth path through the bake compartment of a large indirect heat oven.

The invention resides more particularly in the novel combinations hereinafter described and claimed, reference being made to the accompanying drawing in which:—

Fig. 1 represents a front elevation of an apparatus embodying this invention.

Fig. 2 is a similar view of one of the racks on a larger scale.

Fig. 3 is a vertical section taken along the line 3 3 of Fig. 2.

In the drawing the numeral 5 designates a conveyor which as shown in the drawing is constructed of endless chains made to travel about the interior of the bake compartment of a large oven, as is well-known. There are two of the chains shown in Fig. 1, and a transverse bar or flight 6 is fixed to the chains. A channeled rail 7 is suspended by means of hooks 8 from the bar. The hooks are riveted at their lower ends to the rail and a sleeve 9 has its upper ends 10 as indicated in Fig. 3, hooked over the top of the rail. The sleeve can slide along the rail, but it is normally clamped thereto by means of a thumb-screw 11 arranged under the sleeve.

A depending arm 12 has its upper end securely fastened to the sleeve and it carries a series of shelves 14 one being below the other. Each shelf is riveted to the arm and it has upwardly turned ends 15 to prevent an object from slipping off. The shelf has a sloping bottom so that when an object such as a plate is placed on the bottom the ends thereof will only come into contact with the bottom as indicated in Fig. 3, so that marring of the enamel is practically eliminated.

Two of the shelves one being opposite the other are adapted to carry an object such as a license plate for automobiles. The plate is placed on one shelf and extends over to the opposite shelf, as indicated in dotted lines in Fig. 1, thus being carried between a pair of the shelves. When it is desired to adjust the shelves to different lengths of sign plates a thumb nut is loosened and a sleeve with its rack is slid along the channel rail to or from the opposite rack.

In this arrangement the sign plates or other sheets of metal of various dimensions can be supported between the endless chains, and the shelving with the arms moved transversely to fit any size of plate. Each pair of shelves will thereby support an article placed between the pair of the arms forming the racks. The racks can readily be removed from the conveyor by unhooking the channel rail from the transverse bar fixed to the chains. The shelf slopes from each of its sides toward the center as shown in Fig. 3, so as to give a free space under the plate over the bottom for the heat to circulate.

I claim:—

1. In an apparatus for conveying articles, the combination with a conveyor, of a bar mounted on the conveyor, a rail hooked to the bar, a sleeve connected to the rail, a rack depending from the sleeve, and means for adjusting the sleeve along the rail.

2. In an apparatus for conveying articles, the combination with a conveyor, of a bar mounted on the conveyor, a channeled rail hooked to the bar, a sleeve hooked over the tops of the rail, an arm depending from the sleeve, a series of shelves secured to the arm, and means for adjusting the sleeve to move the arm along the rail.

3. In an apparatus for conveying articles, the combination with a conveyor, of a bar mounted on the conveyor, a channeled rail hooked to the bar, a sleeve hooked over the tops of the rail, an arm depending from the sleeve, a series of shelves secured to the arm, each shelf having a sloped bottom, and means for adjusting the sleeve to move the arm along the rail.

4. In an apparatus for conveying articles, the combination with a conveyor, of a bar mounted on the conveyor, a rail hooked to the bar, a pair of sleeves connected to the rail, an arm depending from each sleeve, a series of shelves secured to each arm one being opposite the other each pair of shelves being made to support an article, and means for adjusting the shelves to move the arms to or from each other.

In testimony whereof I have hereunto set my hand.

CHARLES L. GEHNRICH.